United States Patent [19]
Chimura

[11] 3,947,894
[45] Mar. 30, 1976

[54] MODE SELECTING DEVICE FOR TAPE RECORDING AND/OR REPRODUCING WITH RELEASABLE LOCK

[75] Inventor: Toshihiko Chimura, Atsugi, Japan

[73] Assignee: Sony Corporation, Tokyo, Japan

[22] Filed: Nov. 20, 1974

[21] Appl. No.: 525,679

[30] Foreign Application Priority Data
Nov. 24, 1973 Japan.................. 48-135592[U]

[52] U.S. Cl................................ 360/137; 335/163
[51] Int. Cl.²................... G11B 15/02; G11B 15/04; G11B 15/10
[58] Field of Search.................. 360/137, 90, 60–62, 360/69, 71; 197/107; 235/145; 335/159, 160, 163, 164, 165, 169, 170, 171

[56] References Cited
UNITED STATES PATENTS

| | | | |
|---|---|---|---|
| 3,091,320 | 5/1963 | Mertin | 197/107 |
| 3,305,187 | 2/1967 | Atsumi | 360/137 |
| 3,705,367 | 12/1972 | Peil et al. | 197/107 |
| 3,735,054 | 5/1973 | Poshimura | 360/69 |
| 3,752,938 | 8/1973 | Ozawa | 360/60 |
| 3,800,327 | 3/1974 | Okita et al. | 360/60 |

*Primary Examiner*—Bernard Konick
*Assistant Examiner*—Jay P. Lucas
*Attorney, Agent, or Firm*—Lewis H. Eslinger; Alvin Sinderbrand

[57] ABSTRACT

A mode selecting device for a tape recording and/or reproducing apparatus includes a plurality of push-button members which are selectively actuable from rest positions to active positions for selecting corresponding operating modes of the apparatus, an electrically energizable driving means, such as, a solenoid, which is momentarily energized in response to the actuation of a selected one of the push-button members to its active position, an operating member movable by said driving means from an inoperative position to an operative position in response to the momentary energizing of the solenoid and being urged to its inoperative position upon deenergizing of the solenoid, a plurality of transmission members each being coupled with the operating member in response to the actuation of a respective one of the push-button members for establishing the corresponding operating mode of the apparatus by the movement of the operating member to its operative position, a locking assembly for locking the operating member in its operative position upon the movement to such position by the momentary energizing of the solenoid, and a lock release operative, for example, by actuation of a stop push-button member, to release the locking assembly and permit the return of the operating member to its inoperative position for halting a previously selected operating mode.

In a preferred embodiment, the transmission members are mounted in superposed relation to each other for independent movement parallel to the movement of the operating member, and a plurality of couplings respectively corresponding to the push-button members are provided. Each coupling is displaceable, by actuation of the respective push-button member to its active position, from a disengaged condition, in which the operating member is movable independently of the respective transmission member, to an engaged condition in which the respective transmission member is coupled with the operating member.

15 Claims, 11 Drawing Figures

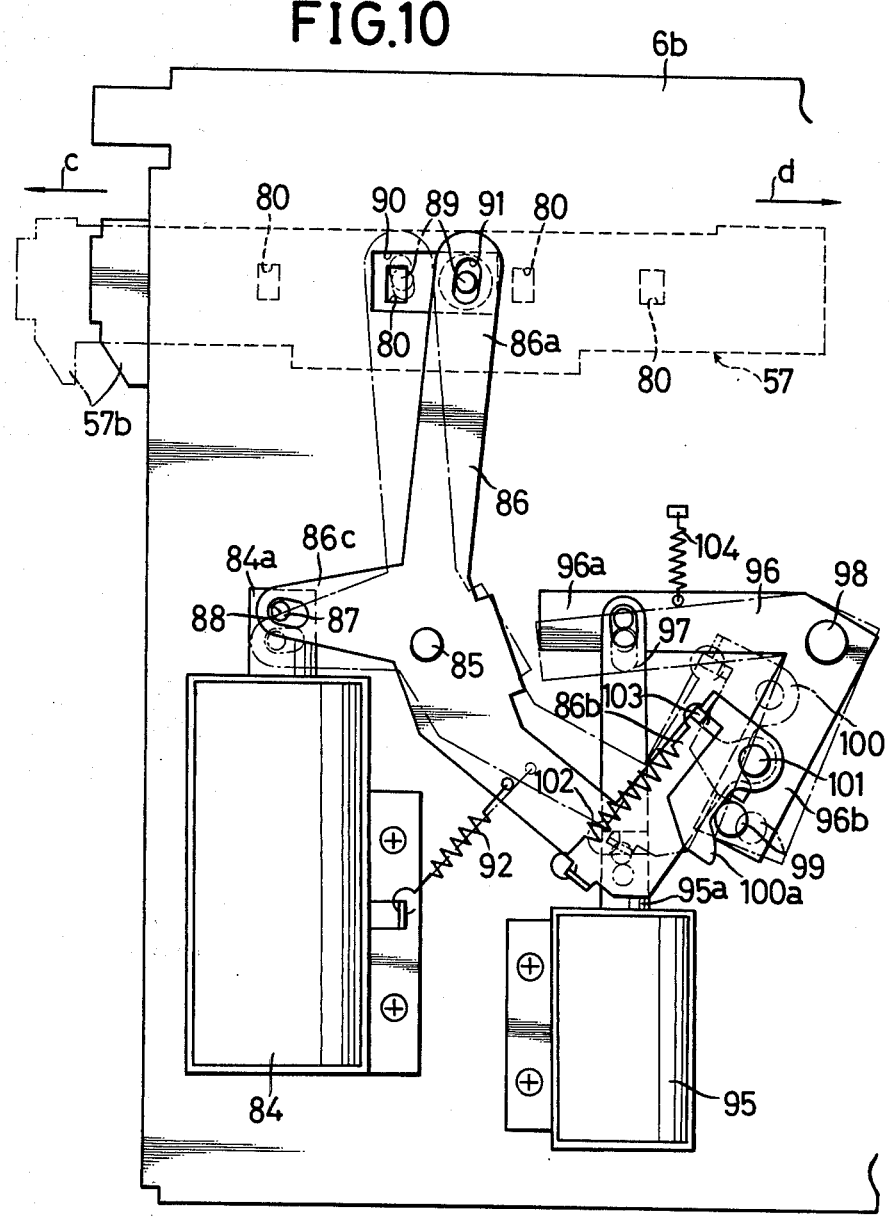

3,947,894

MODE SELECTING DEVICE FOR TAPE RECORDING AND/OR REPRODUCING WITH RELEASABLE LOCK

BACKGROUND OF THE INVENTION

1. Field of the Invention

This invention relates generally to tape recording and/or reproducing apparatus, and more particularly is directed to improvements in operating mode selecting devices of the so-called "feather-touch" type for such apparatus.

2. Description of the Prior Art

Mode selecting devices of the "feather-touch" type have been provided for audio or video tape recording and/or reproducing apparatus in which the operator selectively actuates any desired one of a plurality of push-buttons corresponding to the various operating modes of the apparatus, for example, the modes for normal-forward transport of the tape as during recording and reproducing operations, for fast-forwarding of the tape and for rewinding of the tape, and such actuation of any selected push-button causes closing of a switch for energizing an electrically powered drive and also displaces a corresponding transmission member to an active position where it can be driven by the energized driver for establishing the selected operating mode of the apparatus. Further, in the existing mode selecting devices, each of the push-buttons for selecting an operating mode of the apparatus is locked in its active position upon its actuation to such active position from a rest position so as to maintain the selected operating mode of the apparatus until the locking action is released in response to either the actuation of a stop push-button or the actuation of another one fo the operating mode selecting push-buttons, whereupon the previously actuated push-button is free to be spring-urged to its rest position for halting the operation of the apparatus in the respective operating mode.

Mode selecting devices of the above described type are advantageous in that only a relatively light force need be applied by the operator to a selected push-button for actuating the latter as such manually applied force is only required to close the switch and to displace the corresponding transmission member to its active position, while the major force for establishing the selected operating mode is applied by the electrically powered driver through the active transmission member. However, in such existing mode selecting devices, the electrically powered driver, for example, constituted by a solenoid, is continuously energized for so long as a selected operating mode of the apparatus is maintained and thus consumes substantial electrical power. The foregoing is particularly disadvantageous when the associated tape recording and/or reproducing apparatus is battery powered.

Furthermore, existing mode selecting devices of the "feather-touch" type, and in which a single solenoid is employed to provide the motive force for establishing any selected one of a plurality of operating modes of a tape recording and/or reproducing apparatus in response to the actuation of a respective mode selecting push-button, are relatively bulky, complex and expensive to produce, and thus are not ideally suited for incorporation in relatively low cost or portable tape recording and/or reproducing apparatus.

OBJECTS AND SUMMARY OF THE INVENTION

Accordingly, it is an object of this invention to provide a mode selecting device of the "feather-touch" type employing a solenoid or other electrically powered driver to provide the motive force for establishing a selected operating mode of a tape recording and/or reproducing apparatus, and in which the power consumed by such electrically powered driver is minimized so as to adapt the mode selecting device for inclusion in a battery powered apparatus.

More specifically, it is an object of this invention to provide a mode selecting device of the "feather-touch" type, as aforesaid, in which the solenoid or other electrically powered driver is only momentarily energized for establishing the seleted operating mode of the tape recording and/or reproducing apparatus in response to actuation of a respective push-button, and, thereafter, the selected operating mode is maintained mechanically until such time as a stop push-button is actuated for terminating operation of the apparatus in the selected operating mode.

Another object is to provide a mode selecting device of the "feather-touch" type which employs a single solenoid or other electrically powered driver to provide the motive force for establishing any selected operating mode of a tape recording and/or reproducing apparatus, and which is relatively simple, inexpensive and compact so as to be ideally suited for incorporation in a portable apparatus.

A further object is to provide a mode selecting device, as aforesaid, which is reliable in operation, and which incorporates several features for preventing malfunctioning of the device.

In accordance with an aspect of this invention, a mode selecting device for a tape recording and/or reproducing apparatus includes an electrically energizable driver, such as, a solenoid, which is momentarily energized in response to the actuation of a selected push-button from its rest position to an active position, an operating member movable by the driver from an inoperative position to an operative position in response to the momentary energizing of the driver and being urged, as by a spring, to its inoperative position upon deenergizing of the driver, a plurality of transmission members each being coupled with the operating member in response to the actuation of a respective push-button for establishing the correponding operating mode of the apparatus by the movement of the operating member to its operative position, a locking assembly for locking the operating member in its operative position upon the movement thereto by the momentary energizing of the driver, and a lock release operative, for example, by actuation of a stop push-button, to release the locking assembly and permit the return of the operating member to its inoperative position for halting a previously selected operating mode.

It is a further feature of this invention to mount the several transmission members in superposed relation to each other for independent movement parallel to the movement of the operating member, and to provide a plurality of couplings respectively corresponding to the various operating mode selecting push-buttons, with each coupling being displaceable, by actuation of the respective push-button to its active position, from a disengaged condition, in which the operating member is movable independently of the respective transmission member, to an engaged condition in which the respective transmission member is coupled with the operating member.

The above, and other objects, features and advantages of the invention, will be apparent in the following detailed description of an illustrative embodiment thereof which is to be read in connection with the accompanying drawings.

BRIEF DESCRIPTION OF THE DRAWINGS

FIG. 10 is a bottom plan view of the mode selecting device of FIG. 1 illustrating the electrically powered driver, locking assembly and lock release thereof.

DESCRIPTION OF A PREFERRED EMBODIMENT

Figure 1:
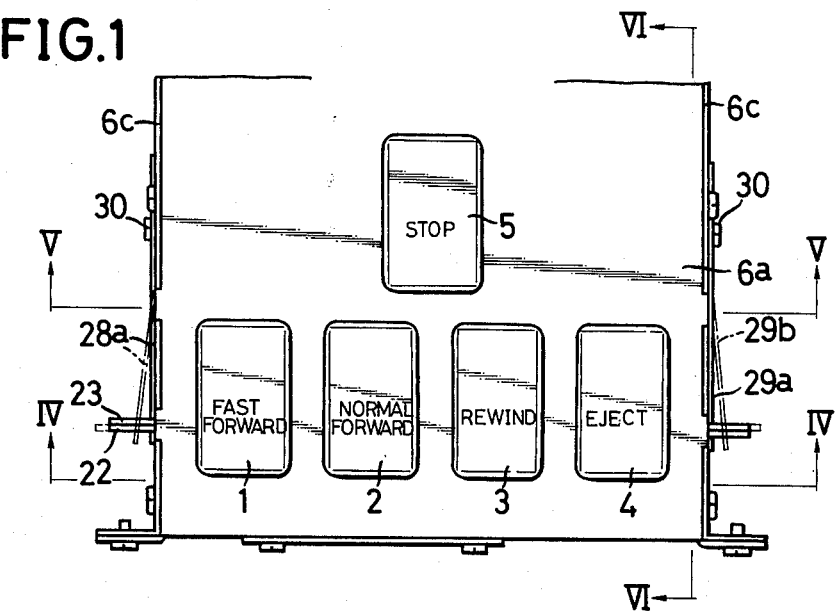
FIG. 1 is a top plan view of a mode selecting device for a tape recording and/or reproducing apparatus according to one embodiment of this invention.
Figure 2:
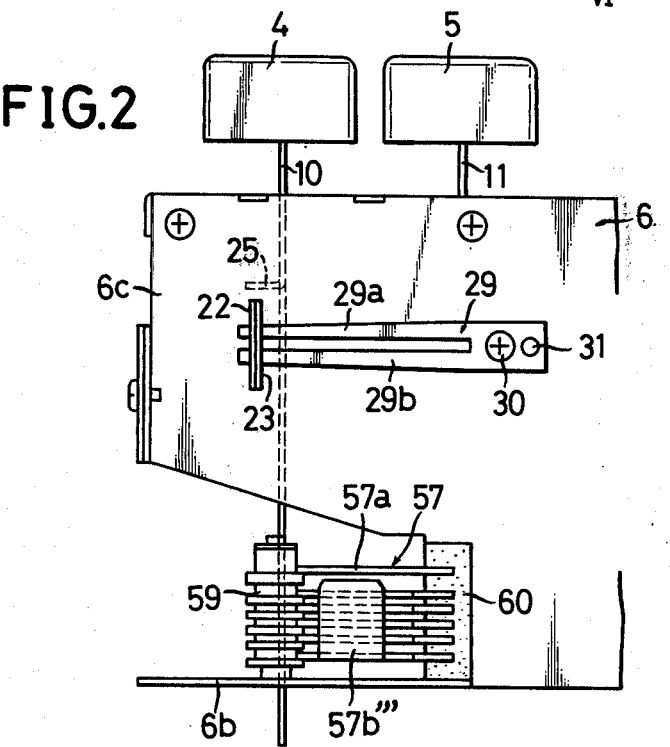
FIG. 2 is a side elevational view of the mode selecting device of FIG. 1.
Figure 3:
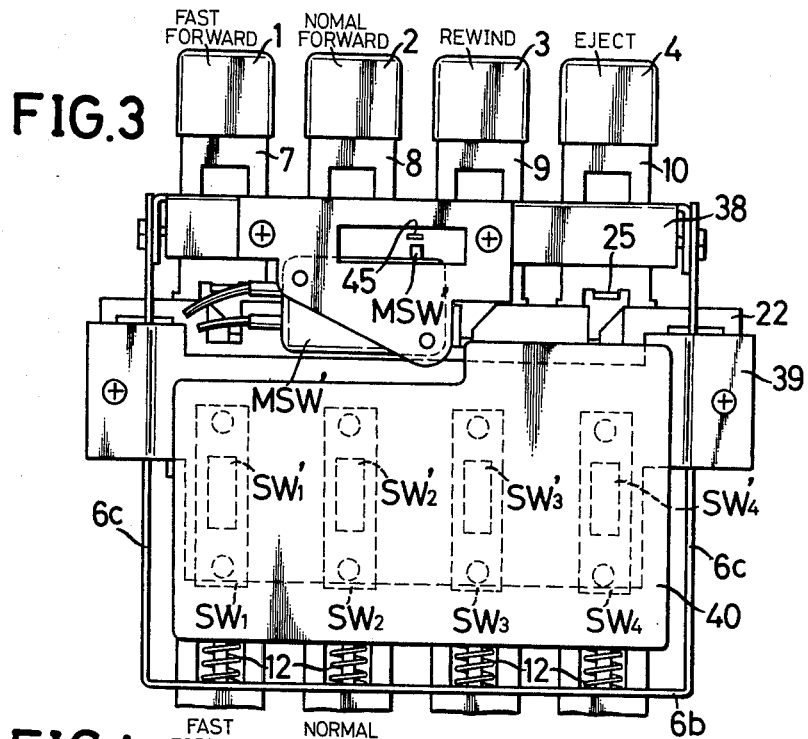
FIG. 3 is a front elevational view of the mode selecting device of FIG. 1.

Referring to the drawings in detail, and initially to FIGS. 1–3 thereof, it will be seen that a mode selecting device according to this invention for a tape recording and/or reproducing apparatus includes push-button assembly which, as shown, includes four push-buttons 1, 2, 3 and 4 arranged in a row for selecting various operating modes of the apparatus, for example, the fast-forward operating mode, the normal-forward operating mode for either reproducing or recording operations, the rewind operating mode and the ejecting operating mode for ejecting a tape cassette from an operative position on the associated apparatus, respectively. The illustrated push-button assembly is further shown to include a stop push-button 5 disposed in back of the row of push-buttons 1–4 and being actuable for returning the associated tape recording and/or reproducing apparatus from any one of the previously mentioned operating modes to a stop or neutral mode. The mode selecting device according to this invention may be provided with additional push-buttons for controlling other functions of the associated tape recording and/or reproducing apparatus, for example, a recording push-button (not shown) which, when actuated simultaneously with the normal-forward push-button 2, selects the recording operating mode while actuation of push-button 2 alone selects the reproducing operating mode.

The illustrated push-buttons 1, 2, 3, 4 and 5 are respectively secured on the upper ends of associated push-button members or slides 7, 8, 9, 10 and 11 which are slidably received in respective pairs of holes 17a and 17b formed in upper and lower plates 6a and 6b, respectively, of a chassis 6 so as to guide push-button members 7–11 for substantially vertical movement between elevated rest positions and depressed active or operative positions. Compression springs 12 (FIGS. 4 and 6) are installed in cutouts within the lower end portions of push-button members 7–11 so as to bear, at their opposite ends, against lower chassis plate 6b and the upper ends of the respective cutouts for urging push-button members 7–11 upwardly to their rest or elevated positions.

In the illustrated mode selecting device, any selected one of the operating mode selecting push-buttons 1–4 which is depressed to its active position is retained or locked in that active position so as to maintain the tape recording and/or reproducing apparatus in the corresponding operating mode until the stop push-button 5 is actuated to return the apparatus to its stop or neutral condition. In order to achieve the foregoing, each of the push-button members or slides 7–10 has a bracket 13 (FIGS. 6 and 7) secured to its upper portion and extending rearwardly therefrom, with each bracket 13 having a rearwardly directed locking projection 13a. A locking plate 14 extends laterally in back of brackets 13 on push-button members 7–10 and is directed upwardly from a pivoting axis defined by an axle 15 journalled, at its opposite ends, in side walls 6c of chassis 6 so that a forwardly directed keeper flange 14a extending along the upper edge of locking plate 14 is movable toward and away from brackets 13 in response to swinging of the locking plate about axle 15. A tension spring 16 is connected between an arm extending from locking plate 14 and an anchor suitably secured to the chassis for yieldably urging the locking plate to swing in the counterclockwise direction, as viewed on FIG. 6, that is, in the direction urging keeper flange 14a against back edges of brackets 13. It will be noted that the free edge of keeper flange 14a and the underside of each locking projection 13a have complementary bevels or inclined surfaces so that, when any one of push-button members 7–10 is moved downwardly from its normal elevated or rest position, in which the respective locking projection 13a is disposed above keeper flange 14a, to its depressed active position, locking plate 14 is rocked rearwardly against the force of spring 16 until the respective locking projection 13a is disposed below keeper flange 14a, whereupon spring 16 returns locking plate 14 forwardly to engage keeper flange 14a over locking projection 13a and thereby retain or lock the actuated push-button 1, 2, 3 or 4 and the respective member or slide 7, 8, 9 or 10 in its active position. In order to effect the release of keeper flange 14a from the locking projection 13a associated with one of the push-button members or slides 7–10 that has been previously depressed to its active position, an arm 14b extends rearwardly from locking plate 14 below an abutment 11a on the slide 11 associated with stop push-button 5. It will be apparent that, when stop push-button 5 is actuated or depressed to its active position, abutment 11a acts downwardly on arm 14b to swing locking plate 14 rearwardly and thereby permit a previously actuated push-button 1, 2, 3 or 4 to return to its elevated rest position.

Rubber cushions or bumpers 18 (FIGS. 4 and 6) are provided on lugs struck from the upper end portions of push-button members 7–11 so as to be engageable against the underside of upper plate 6a of the chassis for limiting the upward movement of such members 7–11 at the active positions thereof, and for cushioning the return movements of members 7–11 to such active positions under the influence of the respective springs 12.

In order to prevent the actuation of any one of the operating mode selecting push-buttons 1–4 to its active position at a time when another one of such push-buttons 1–4 is already in its active position, the illustrated mode selecting device according to this invention is shown to further include first and second slides 22 and 23 (FIGS. 2,4,6 and 7) arranged one in back of the other and extending laterally across the chassis in front of push-button members 7–10. The end portions of slides 22 and 23 are slidably received in elongated openings 24a and 24b provided in the opposite side plates or walls 6c of chassis 6 so that slides 22 and 23 can slide laterally independently of each other. Each of push-button members 7–10 has a lug 25 struck forwardly therefrom so as to extend over slides 22 and 23. The slides 22 and 23 have cutouts 26 and 27 in their upper edges 22a and 23a, respectively, at locations spaced apart along slides 22 and 23 corresponding to the push-button members 7–10. Further, the cutouts 26 have inclined edges 26a at one side or the other thereof with such inclined edge at least partly overlapping the respective cutout 27 when slides 22 and 23 are disposed in central positions, as shown in full lines on FIG. 4. Further, with slides 22 and 23 in their central positions, the rectangular cutouts 27 are shown to be vertically registered with the lugs 25 on the respective push-button members 7–10.

Figure 4:
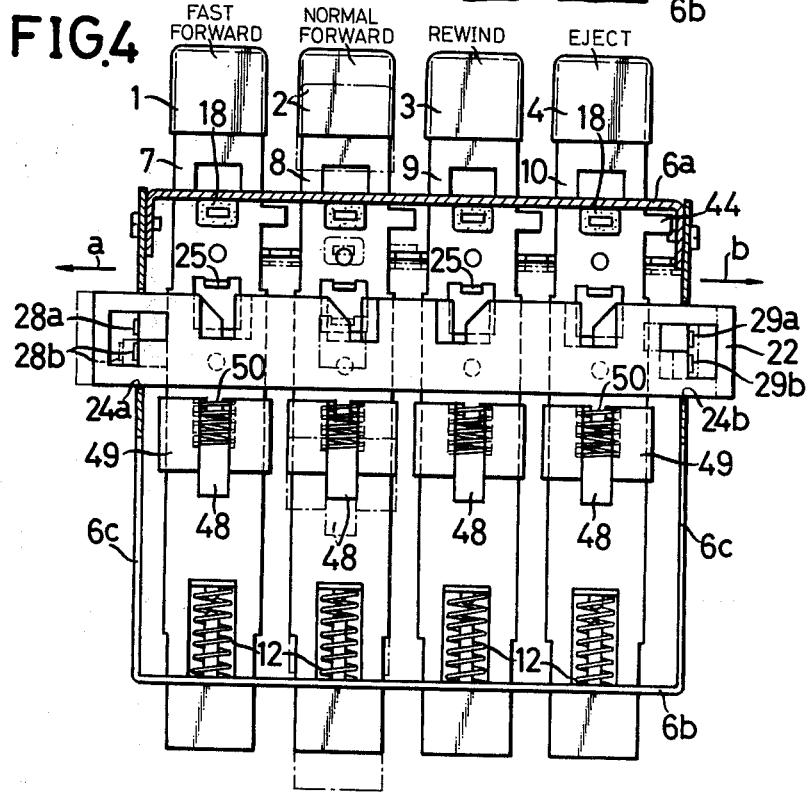
FIG. 4 is a vertical sectional view taken along the line IV—IV on FIG. 1, and with certain elements of the mode selecting device being removed for exposing details of the push-button members located therebehind.

It will be seen that, when the normal-forward push-button 2 is depressed, the lug 25 of the associated member 8 acts against the inclined edge 26a of the respective cutout 26 in slide 22 so as to effect movement of the latter from its central position in the direction of the arrow a on FIG. 4. Similarly, when the rewind push-button 3 is depressed, the lug 25 of the associated member 9 acts downwardly on the inclined edge 26a of the respective cutout 26 in slide 22 so as to laterally move the latter from its central position in the direction of the arrow b on FIG. 4. When the fast-forward push-button 1 is depressed, the lug 25 on the associated member 7 acts against the inclined edge 26a of the cutout 26 in the slide 23 for moving the latter from its central position in the direction of the arrow a, whereas, when the ejecting push-button 4 is depressed, the lug 25 on the associated member 10 acts against the inclined edge 26a of the respective cutout 26 in the slide 23 for moving the latter from its central position in the direction of the arrow b. Thus, when any one of the push-buttons 1–4 is depressed to its active position, either the slide 22 or the slide 23 is laterally moved from its central position in the direction of either the arrow a or the arrow b. When either of the slides 22 and 23 is laterally displaced, in either direction, from its central position in response to the actuation of any one of the push-buttons 1–4 to its active position, the cutouts 26 or 27 in the laterally displaced slide 22 or 23 no longer register with the lugs 25 on the push-button members associated with the other operating mode selecting push-buttons, and thus such lugs 25 are engageable with the top edge 22a or 23a of the slide 22 or 23, respectively, to prevent actuation of the other push-buttons to their active positions. Furthermore, it will be apparent that, by reason of the described arrangement of slides 22 and 23, two or more of the push-buttons 1–4 cannot be simultaneously actuated to their respective active positions. Accordingly, the mode selecting device according to this invention permits the selection of only one operating mode of the apparatus at any time and ensures that the operating mode of the apparatus can be changed only after the stop push-button 5 has been actuated to halt a previously selected operating mode.

Figure 7:
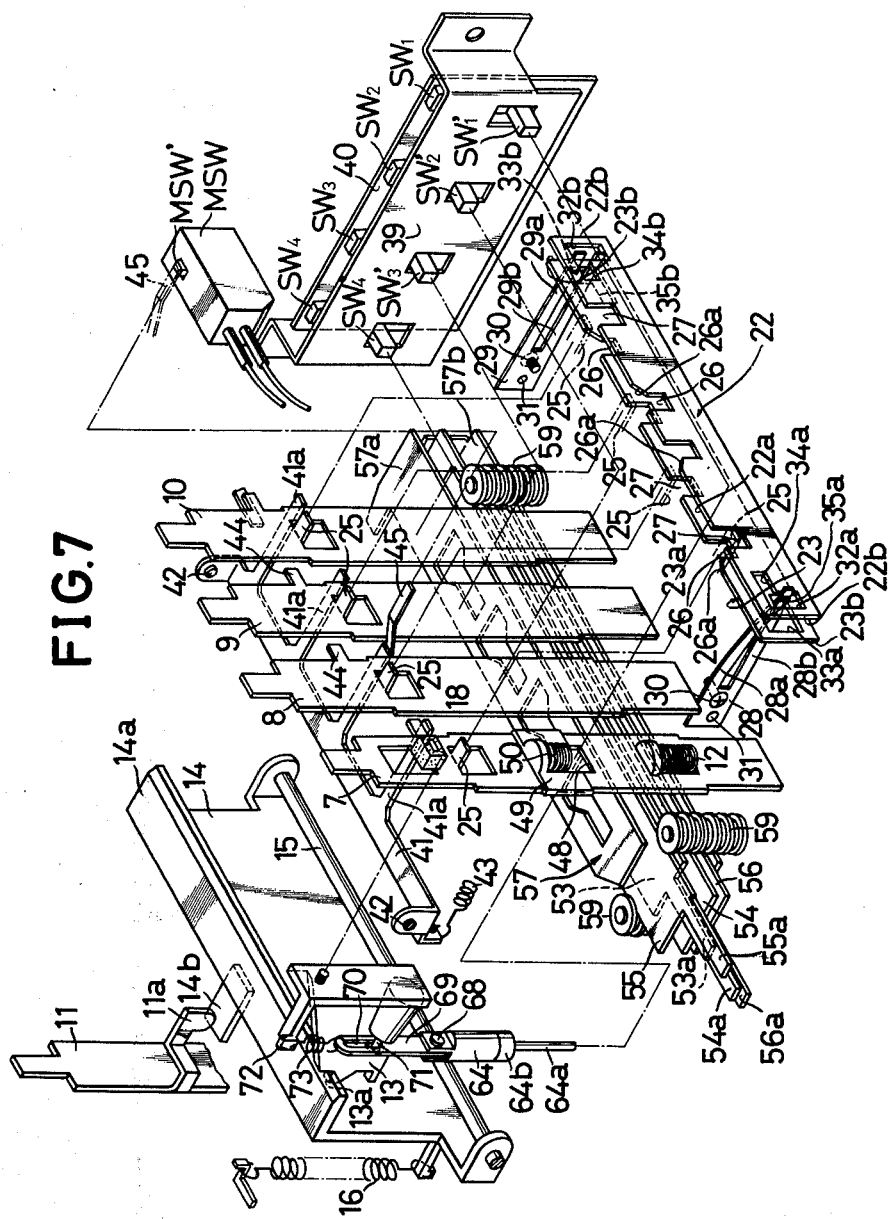
FIG. 7 is an exploded perspective view of some of the elements included in the mode selecting device of FIG. 1.

In order to yieldably urge slides 22 and 23 to their central positions, leaf-springs 28 and 29 are mounted on the opposite side plates 6c of chassis 6, as by screws 30 and dowels 31 (FIGS. 2 and 7). Leaf-spring 28 is shown to include upper and lower resilient fingers or spring strips 28a and 28b which extend forwardly along the outer surface of the respective side plate 6c. Similarly, leaf-spring 29 has forwardly directed upper and lower resilient fingers or spring strips 29a and 29b. The opposite end portions of slide 22 are provided with inverted L-shaped openings 32a and 32b, while the opposite end portions of slide 23 are provided with L-shaped openings 33a and 33b. As shown particularly on FIG. 7, the free end portions of resilient fingers 28a and 28b project forwardly through openings 32a and 33a in the adjacent end portions of slides 22 and 23, while the free end portions of resilient fingers 29a and 29b similarly project forwardly through the openings 32b and 33b in the adjacent end portions of slides 22 and 23. Further, the upper resilient fingers 28a and 29a are laterally aligned with the laterally extending portions 34a and 34b of the inverted L-shaped openings 32a and 32b, respectively, while the lower resilient fingers 28b and 29b are laterally aligned with the laterally extending portions 35a and 35b of the L-shaped openings 33a and 33b, respectively.

By reason of the foregoing arrangement, lateral displacements of slide 22 from its central position in the directions of the arrows a and b are resisted by the lower resilient fingers 28b and 29b, respectively, while the upper resilient fingers 28a and 29a are merely received in the lateral portions 34a and 34b of openings 32a and 32b during such displacements so as to continue to hold slide 23 in its central position. Conversely, lateral displacements of slide 23 from its central position in the directions of the arrows a and b are resisted by the resilient fingers 28a and 29a, and, during such displacements of slide 23, resilient fingers 28b and 29b are received in the lateral portions 35a and 35b of openings 33a and 33b so as to continue to hold slide 22 in its central position. Thus, leaf-springs 28 and 29 are effective to yieldably urge slides 22 and 23 to their central positions independently of each other. It will further be noted that the resilient fingers of leaf-springs 28 and 29, in extending through the openings 32a and 32b of slide 22 and the openings 33a and 33b of slide 23 are engageable by the end portions 22b and 23b of slides 22 and 23 for limiting the displacements of such slides in the directions of the arrows b and a, respectively.

Figure 6:
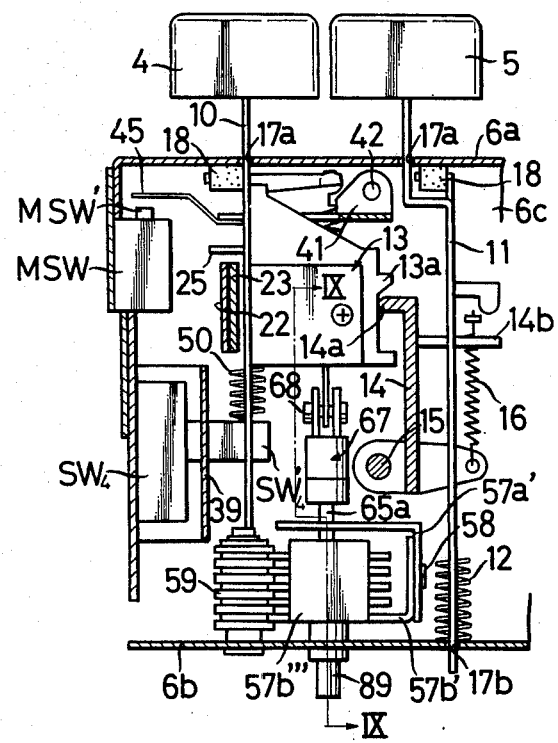
FIG. 6 is a sectional view taken along the line VI—VI on FIG. 1.

As shown on FIGS. 3 and 6, a normally open microswitch MSW is mounted in front of push-button members 7–10 on a bracket 38 which extends laterally between the upper portions of side plates 6c of the chassis. Further, laterally spaced apart slide switches SW₁,SW₂,SW₃ and SW₄ respectively corresponding to the push-button members 1,2,3 and 4 are mounted in front of the latter on a mounting plate 39 which extends between side chassis plates 6c below micro-switch MSW, and may include various contacts by which the circuits of the associated tape recording and/or reproducing apparatus are controlled for the respective operating modes of the latter. A base or substrate 40 of a printed circuit may be mounted in front of slide switches SW₁–SW₄, as shown. A rockable switch-operating member 41 may extend laterally across chassis 6 in back of push-button members 7–10 and be mounted at its opposite ends, as by pivot pins 42 carried by the adjacent side plates 6c for rocking about a horizontal axis (FIGS. 6 and 7). Laterally spaced apart fingers 41a project forwardly from switch operating member 41 along side member 7–10, respectively, and a spring 43 is connected between switch operating member 41 and a suitable anchor on the chassis (FIG. 7) so as to urge fingers 41a upwardly towards engagement with lugs 44 extending laterally from the upper portions of the respective members 7–10. A leaf-spring or resilient extension 45 extends forwardly from one of the fingers 41a and, at its free end portion, is disposed above the actuator MSW' of micro-switch MSW. When all of push-buttom members 7–10 are in their elevated rest positions, spring 43 urges switch operating member 41 to the position shown on FIG. 6 in which leaf-spring 45 is disengaged from switch actuator MSW' so that micro-switch MSW can be in its normally open condition. However, during the initial downward movement of any one of push-button members 7–10 from its rest position toward its active position, the respective lug 44 depresses the finger 41a engaged therewith with the result that leaf-spring 45 acts downwardly against the switch actuator of micro-switch MSW for changing over the latter to its closed condition.

Slide switches SW₁, SW₂, SW₃ and SW₄ are shown to have vertically movable switch actuators SW'₁, SW'₂, SW'₃ and SW'₄, respectively, which extend rearwardly through respective, vertically elongated openings in mounting plate 39 (FIG. 7) and which are received in vertically elongated openings 48 formed in the respective push-button members 7–10 (FIG. 4). Further, each of push-button members 7–10 carries a spring holder 49 which positions a helical compression spring 50 in the respective cutout 48 above the switch actuator SW'₁, SW'₂, SW'₃ or SW'₄ extending into the respective opening 48. It will be noted that the slide switches SW₁–SW₄, which are normally in open condition, are located so that, upon actuation of one of the push-button members 7–10 to its depressed active position, the respective spring 50 will act on the switch actuator therebelow so as to change over the associated slide switch to its closed or ON condition only as the displaced push-button member reaches its active position, that is, subsequent to the closing of micro-switch MSW by the action of the leaf-spring 45 thereon. Of course, when stop push-button 5 is depressed to permit the return to its elevated rest position of one of the push-button members 7–10 which was previously locked in its active position, such return movement of the push-button member will first permit the return of the associated one of the slide switches SW₁–SW₄ to its open condition and finally the return of micro-switch MSW to its open condition.

Referring not to FIGS. 5–9, it will be seen that the mode selecting device according to this invention further includes transmission members 53,54,55, and 56 respectively corresponding to the push-button members 7,8,9 and 10 for establishing the fast forward, normal forward, rewind and ejecting operating modes of an associated tape recording and/or reproducing apparatus when the respective push-button member is depressed to its active position. The transmission members 53–56 are shown to be in the form of elongated plates which are superposed one above the other and extend laterally across the chassis in back of push-button members 7–10. The mode selecting device further has an operating member 57 made up of upper and lower elongated plates 57a and 57b which are joined in parallel, spaced relation, for example, by means of flanges 57a' and 57b' which extend from the back edges of plates 57a and 57b and which are joined in overlapping relation, as by screws 58 (FIG. 6). The superposed transmission members 53–56 are positioned between plates 57a and 57b of operating member 57, and grooved rollers 59 are rotatably mounted on bottom plate 6b of the chassis and engage the opposite longitudinal edges of transmission members 53–56 and of plates 57a and 57b so as to mount the operating member 57 and the transmission members 53–56 for independent longitudinal movements in lateral directions with respect to chassis 6, for example, in the directions indicated by the arrows c and d on FIG. 9.

The transmission members 53,54,55 and 56 are shown to have staggered extensions 53a,54a,55a and 56a, at one end, which are respectively connected with or act upon, suitable conventional mechanisms of a tape recording and/or reproducing apparatus by which the fast-forward, normal-forward, rewind and ejecting operating modes of the apparatus are respectively established. For example, if the mode selecting device according to this invention is associated with a tape recording and/or reproducing apparatus of the type in which the tape is wound on supply and take-up reels within a cassette and a magnetic recording or reproducing head is engageable with a run of the tape between such reels exposed at a window of the cassette housing only during recording or reproducing operations, then the driving of transmission member 54 in the direction of the arrow c on FIG. 9 causes the associated mechanism (not shown) to displace the magnetic head to an operative position against the tape, to engage a pinch roller against a rotated capstan with the tape therebetween for moving or transporting the tape in the direction toward the take-up reel at the normal-forward speed for recording or reproducing, and to drive the take-up reel at a relatively slow speed for winding the tape thereon. On the other hand, when transmission member 53 is moved in the direction of the arrow c from the position thereof shown on FIG. 9, the associated mechanism (not shown) is effective to cause the relatively high speed rotation of the take-up reel in the direction for winding the tape thereon while the magnetic head remains in its inoperative position spaced from the tape and the pinch roller is spaced from the capstan. Similarly, when transmission member 55 is driven in the direction of the arrow c from the position thereof shown on FIG. 9, the associated mechanism (not shown) is effective to cause the relatively high speed rotation of the supply reel in the direction for rewinding the tape thereon, while the magnetic head and pinch roller are again maintained in their inoperative positions. Finally, when transmission member 56 is driven in the direction of the arrow *c* from its position shown on FIG. 9, the associated mechanism (not shown) may be effective to eject the cassette from its operative position within the tape recording and/or reproducing apparatus.

Figure 8:
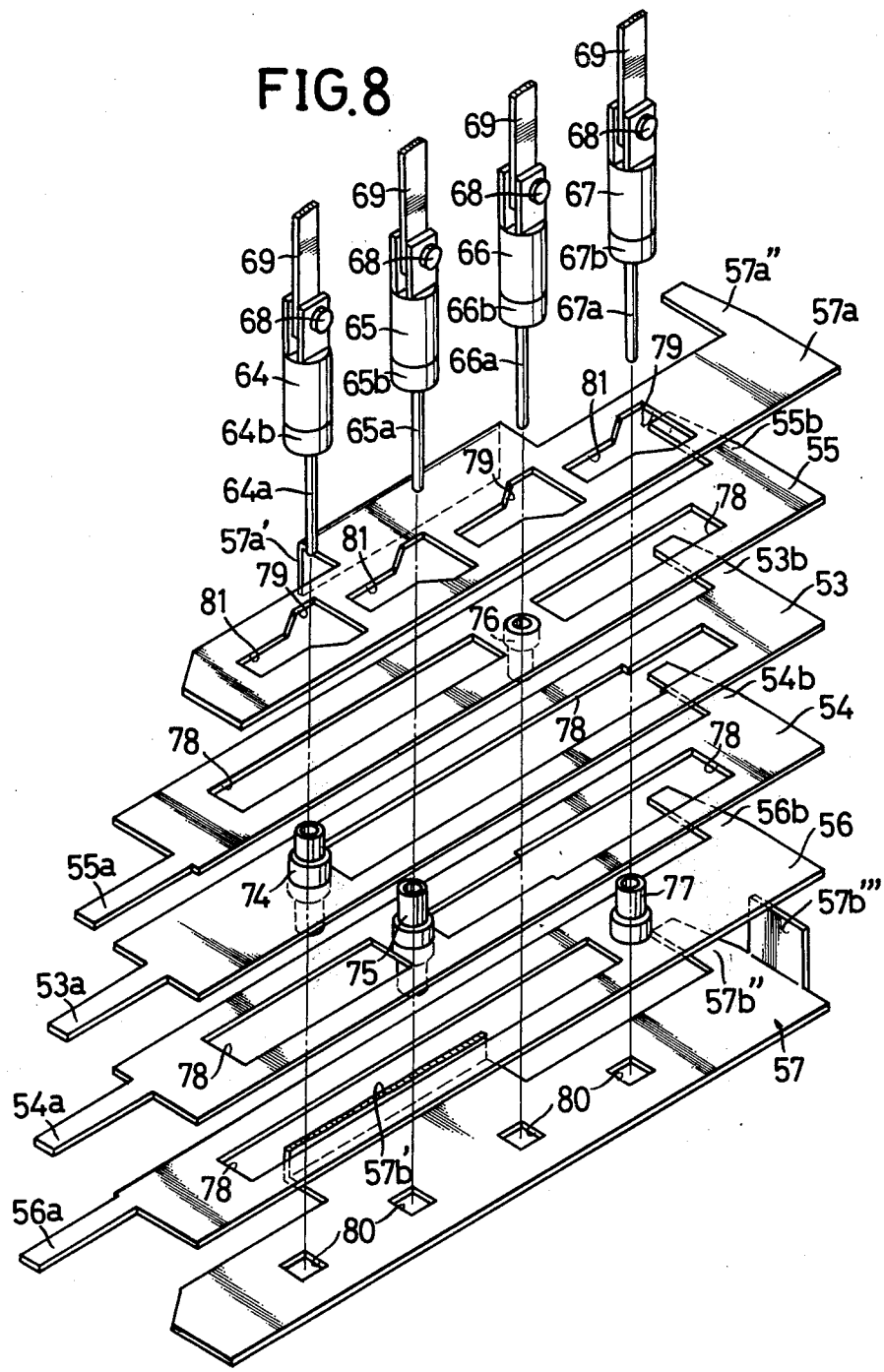
FIG. 8 is an exploded perspective view of the operating member, transmission members and couplings included in the mode selecting device of FIG. 1.

As shown particularly on FIG. 8, the end portions of transmission members 53–56 remote from extensions 53a–56a are provided with rearwardly directed projections 53b–56b, and the adjacent ends of upper and lower plates 57a and 57b of operating member 57 have similar rearwardly directed projections 57a″ and 57b″. Such rearwardly directed projections 53b–56b, 57a″ and 57b″ are all disposed at the outside of the adjacent side plates 6c of chassis 6 and are engageable against a cushion 60 (FIG. 2) on such side plate 6c for limiting the movements of transmission members 53–56 and of operating member 57 in the direction of the arrow *d* on FIG. 9 at positions corresponding to an inoperative position of operating member 57. Further, the lower plate 57b of operating member 57 has an upstanding lug 57b‴ (FIGS. 6, 8 and 9) at the end thereof remote from extensions 53a–56a of transmission members 53–56. It will be apparent that, when operating member 57 is moved in the direction of the arrow *d* drom its operative position shown on FIG. 9, lug 57b‴ will engage the adjacent end of any one of the transmission members 53–56 which has previously been moved to its operative position with operating member 57, and thereby cause the return of such transmission member to its inoperative position in response to the movement of operating member 57 in the direction of the arrow *d*.

Figure 5:
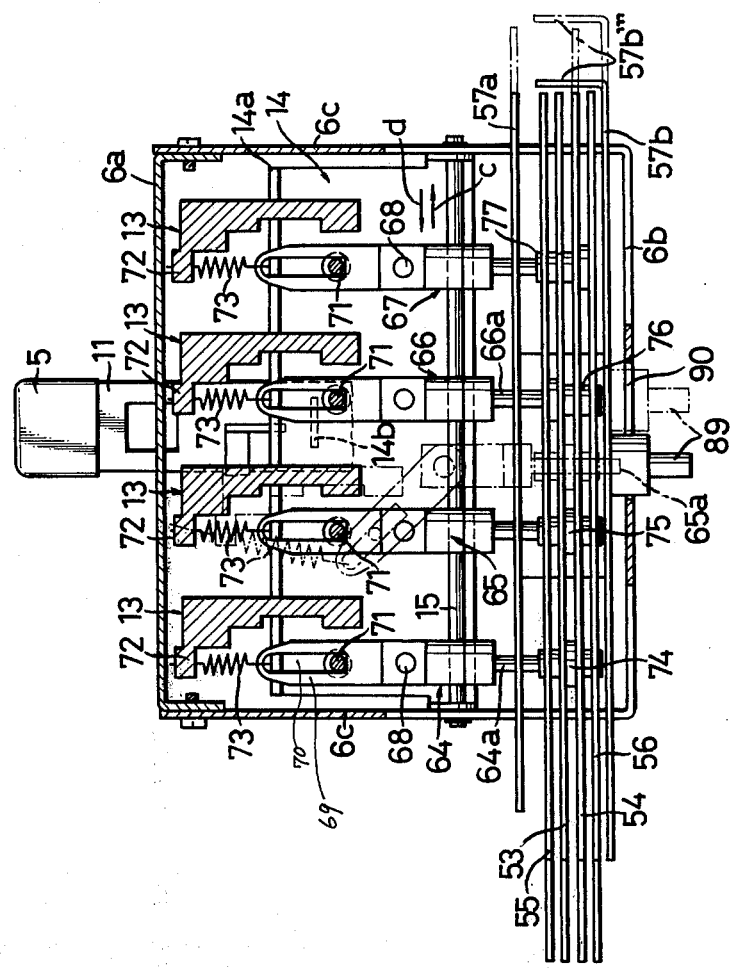
FIG. 5 is a sectional view taken along the line V—V on FIG. 1.

Coupling 64,65,66 and 67 respectively corresponding to push-button members 7,8,9 and 10 are arranged behind the latter and provided for selectively coupling transmission members 53,54,55 and 56, respectively, for movements with operating member 57 between the inoperative and operative positions of the latter. The couplings 64–67 are shown to be generally in the form of coupling pins having enlarged heads 64b–67b from which reduced diameter stems 64a–67a, respectively, depend. The coupling pins 64–67 are shown to be pivotally connected, as at 68, to the lower end portions of links 69 (FIGS. 8 and 9), while the upper end portions of the links 69 are shown to have longitudinally elongated slots 70 (FIG. 5) which slidably receive pins 71 carried by the brackets 13 secured on the respective push-button members 7–10 (FIG. 7). Further, a spring 73 is connected between the upper end of each link 69 and an arm 72 on the associated bracket 13 for urging each link 69 upwardly to a position in which the respective pin 71 engages the lower end of slot 70 (FIGS. 5 and 7).

The couplings 64,65,66 and 67 are further shown to include coupling sleeves 74,75,76 and 77, respectively, which are fixed to transmission members 53,54,55 and 56 and arranged vertically to slidably receive stems 64a,65a,66a and 67a of the respective coupling pins. As shown particularly on FIG. 8, transmission members 53–56 have longitudinal slots 78 therein so that each of the coupling sleeves 74–77 secured to transmission members 53–56, respectively, can slide along the slots 78 of the other transmission members. The upper plate 57a of operating member 57 is shown to have four spaced apart apertures 59 which are dimensioned to receive the enlarged heads 64b–67b of the respective coupling pins, while the lower plate 57b of the operating member is shown to have four relatively small spaced apart apertures 80 which are dimensioned to receive the lower end portions of stems 64a–67a in the engaged conditions of the respective couplings, as hereinafter described in detail. Further, each of the apertures 79 in upper plate 57a is shown to have an extension 81 of reduced width opening from the respective aperture 79 in the longitudinal direction, and along which the stems 64a–67a of the coupling pins are adapted to be relatively slidable in the disengaged conditions of the respective couplings.

Figure 9:
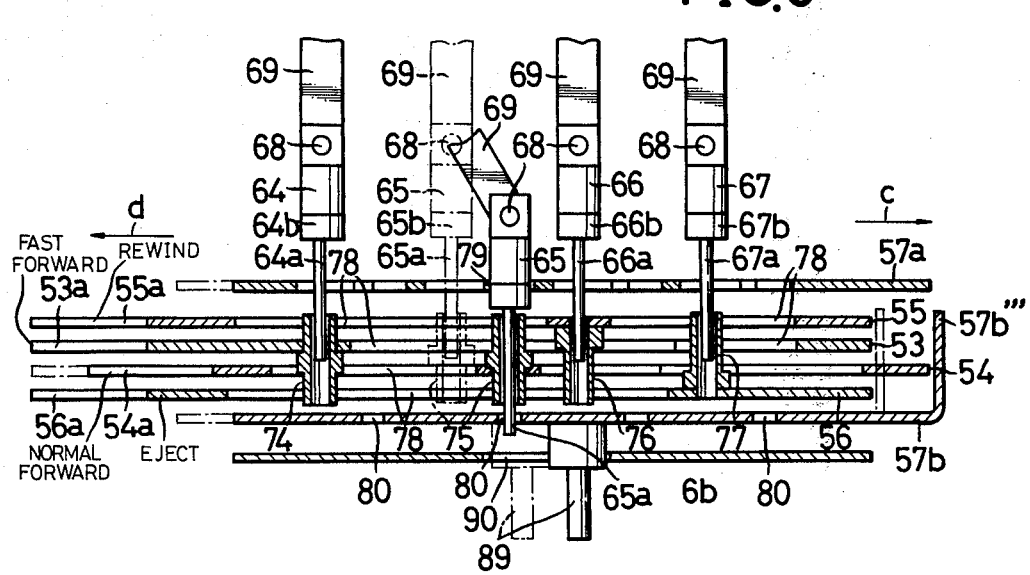
FIG. 9 is a fragmentary sectional view taken along the line IX—IX on FIG. 6, but showing the mode selecting device conditioned for selecting one of the operating modes of the associated tape recording and/or reproducing apparatus.

When push-buttons 1–4 are in their raised or rest positions, the respective couplings 64–67 are in their disengaged conditions in which the lower end portions of the respective stems 64a–67a engage in the respective sleeves 74–77 and the heads 64b–67b of the coupling pins are disposed above upper plate 57a of operating member 57, for example, as shown on FIG. 9 in respect to couplings 64,66 and 67. When any one of pushbuttons 1–4 is depressed to its active position, for example, when push-button 2 is depressed to its active position for selecting the normal forward operating mode of the apparatus, the engagement of the respective pin 71 against the lower end of the slot 70 in the respective link 69 causes corresponding downward movement of the coupling pin of the respective coupling 65 to establish the engaged condition of the coupling. As shown on FIG. 9, in the engaged condition of coupling 65, the stem 65a of the coupling pin extends axially through sleeve 75 secured to transmission member 54, and the lower end of stem 65a is received in the respective aperture or hole 80 in the lower plate 57b of operating member 57. Further, in the engaged condition of coupling 65, the head 65b of its coupling pin extends into the respective aperture 79 in upper plate 57a of operating member 57. Thus, in the engaged condition of coupling 65, the respective transmission member 54 is coupled to the operating member 57 for movement longitudinally with the latter in the direction of the arrow *c* on FIG. 9 from the inoperative position of operating member 57 to the illustrated operative position of the latter. During such movement of transmission member 54 with operating member 57, the other transmission members 53,55 and 56 can remain stationary at the positions shown on FIG. 9, as coupling sleeve 75 on transmission member 54 slides along slots 78 in transmission members 53,55 and 56 and the stems 64a,66a and 67a of disengaged couplings 64,66 and 67 enter the respective extensions 81 of the holes or apertures 79 in the upper plate 57a of operating member 57 to permit movement of the latter independently of transmission members 53,55 and 56.

Referring now to FIG. 10, it will be seen that an electrically energizable driving means for the operating member 57 may generally include a solenoid 84 suitably secured to lower plate 6b of the chassis, and a three-armed lever 86 which is pivoted approximately at its center on a pivot pin 85 depending from lower plate 6b. The armature 84a of solenoid 84 is connected with lever 86, for example, by a pin 87 extending from armature 84a and received in an elongated opening 88 formed in a laterally directed arm 86c of lever 86. A forwardly directed arm 86a of lever 86 is pivotally connected to operating member 57, for example, by a pin 89 depending from the lower plate 57b of operating member 57 through a laterally elongated opening 90 in the lower chassis plate 6b and being received in an elongated opening 91 formed in the free end portion of lever arm 86a. A spring 92 is connected between the third arm 86b of lever 86 and the housing of solenoid 84 for urging lever 86 in the clockwise direction to the position shown in full lines on FIG. 10 which corresponds to the inoperative position of operating member 57. It will be apparent that the energizing of solenoid 84 to retract its armature 84a will be effective to angularly displace lever 86 in the counter-clockwise direction, for example, to the position shown in broken lines on FIG. 10 which corresponds to the operative position of operating member 57.

As hereinafter described in detail, it is an important feature of the mode selecting device according to this invention that the solenoid 84 thereof is only momentarily energized for moving operating member 57 to its operative position and thereby providing the motive force for establishing a selected mode of operation of the associated tape recording and/or reproducing apparatus. In order to ensure that the selected mode of operation established by means of the movement of operating member 57 to its operative position will be maintained until such time as stop push-button 5 is actuated for returning the apparatus to its stop or neutral mode, the mode selecting device according to this invention further includes a locking assembly having a normal locking condition for locking the operating member 57 in its operative position and a released condition in which the operating member 57 is free to be returned to its inoperative position by the force of spring 92 acting on lever 86. In the illustrated embodiment of the invention, such locking assembly is shown to include a locking lever 96 having angularly related arms 96a and 96b and being pivotally mounted, intermediate such arms, on a pivot pin 98 carried by lower chassis plate 6b. A spring 104 is connected between lever arm 96a and an anchor on lower chassis plate 6b for urging lever 96 in the clockwise direction to the position shown in full lines on FIG. 10, and in which a locking pin 99 carried by lever arm 96b is urged against a hooked latching element 100 which is pivoted, as at 101, on the free end of arm 86b of lever 86. Further, a spring 102 is connected between latching element 100 and lever arm 86b for urging latching element 100 in the counter-clockwise direction about pivot 101 to the position shown in full lines at which latching element 100 engages against a stop 103 on arms 86b.

It will be apparent that, when solenoid 84 is energized to angularly displace lever 86 to the position shown in broken lines on FIG. 10, a nose 100a on latching element 100 rides past locking pin 99 with latching element 100 being pivotally deflected against the force of spring 102 until nose 100a moves past locking pin 99, whereupon spring 102 returns latching element 100 to its position against stop 103 so that nose 100a of the latching element is disposed to be engaged by locking pin 99, as shown in broken lines on FIG. 10, for holding lever 86 in the position shown in broken lines, that is, the position corresponding to the operative position of operating member 57, even through solenoid 84 is deenergized.

In order to release the above described locking assembly, lever 96 is pivoted in the counter-clockwise direction, for example, to the position shown in broken lines on FIG. 10, in response to the actuation of stop push-button 5. Such movement of lever 96 withdraws locking pin 99 from engagement with the nose 100a of latching element 100, and thereby permits spring 92 to return lever 86 to the position shown in full lines on FIG. 10, and which corresponds to the inoperative position of operating member 57. In the illustrated embodiment, the pivoting of lever 96 for releasing the locking assembly is effected by the energizing of a solenoid 95 which is suitably mounted on lower plate 6b of the chassis and which has its armature 95a pivotally connected, as by a link 97, to the arm 96a of lever 96. As will be hereinafter described in detail, the energizing of solenoid 95 is effected in response to the actuation of stop push-button 5 so that the armature 95a of armature 95 is retracted for angularly displacing lever 96 to the position shown in broken lines on FIG. 10.

Figure 11:
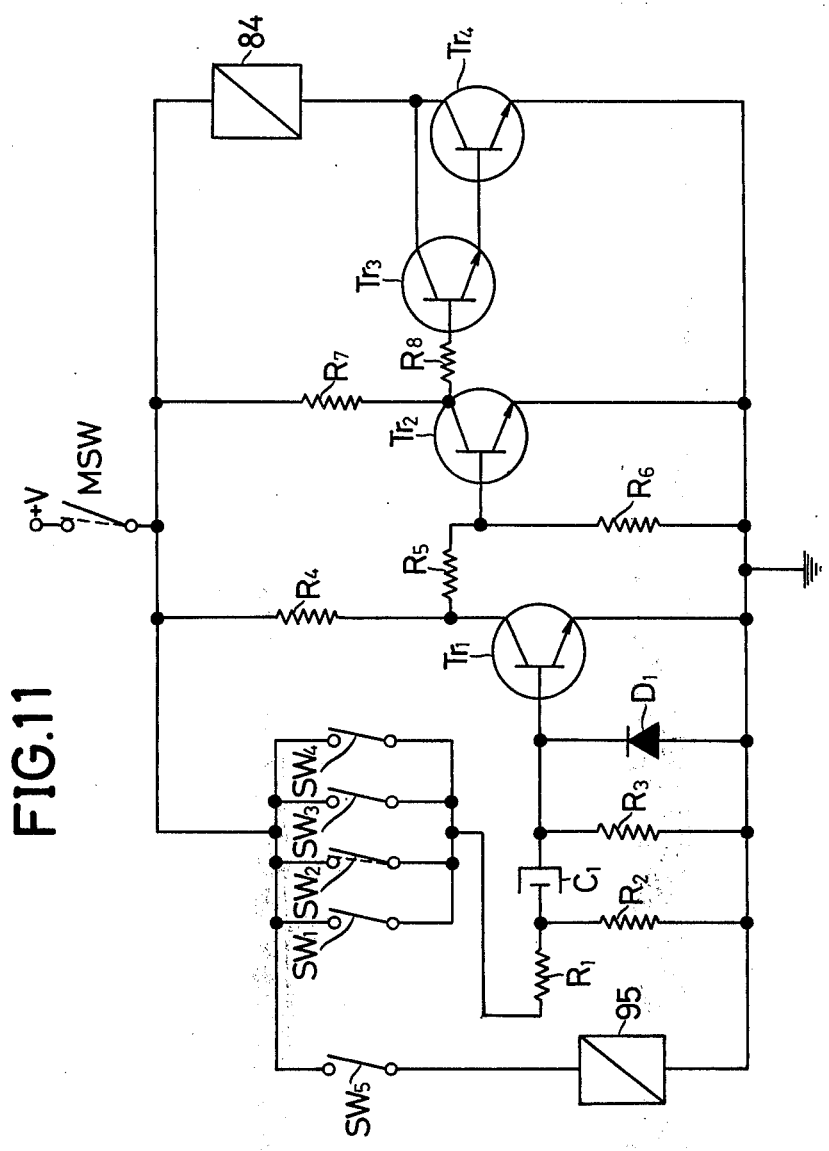
FIG. 11 is a circuit diagram illustrating the electrical control circuits for the mode selecting device of FIG. 1.

Referring now to FIG. 11, it will be seen that control circuits of the mode selecting device according to this invention for effecting momentary energizing of solenoid 84 in response to the actuation of any one of push-button 1–4 to its active position may include switching transistors $Tr_1$ and $Tr_2$ and amplifying transistors $Tr_3$ and $Tr_4$. The normally open micro-switch MSW is connected in a series circuit with a parallel arrangement of normally open contacts of slide switches $SW_1$, $SW_2$, $SW_3$ and $SW_4$ and with resistors $R_1$ and $R_2$ between a DC voltage source +V and ground. A connection point or junction between resistors $R_1$ and $R_2$ is connected through a capacitor $C_1$ to the base electrode of switching transistor $Tr_1$, and such base electrode is connected to ground through a parallel arrangement of a resistor $R_3$ and a diode $D_1$ which is polarized to conduct in the direction toward the base electrode of transistor $Tr_1$. The collector electrode of transistor $Tr_1$ is connected through a resistor $R_4$ to micro-switch MSW, and through a resistor $R_5$ to the base electrode of transistor $Tr_2$. The emitter electrode of transistor $Tr_1$ is connected directly to ground, while the base electrode of transistor $Tr_2$ is connected to ground through a resistor $R_6$. The collector electrode of transistor $Tr_2$ is connected to micro-switch MSW through a resistor $R_7$ and to the base electrode of amplifying transistor $Tr_3$ through a resistor $R_8$, while the emitter electrode of transistor $Tr_2$ is connected directly to ground. Further, as shown, solenoid 84 is connected in a series circuit with micro-switch MSW and the collector-emitter path of amplifying transistor $Tr_4$ between the DC voltage source +V and ground, and the collector and emitter electrodes of amplifying transistor $Tr_3$ are respectively connected to the collector electrode and base electrode of transistor $Tr_4$. Further, as shown on FIG. 11, solenoid 95 for releasing the lock assembly may be connected in a series circuit with micro-switch MSW and with a normally open switch $SW_s$ between the DC voltage source +V and ground. The normally open switch $SW_s$ may be suitably actuated to its closed condition for energizing solenoid 95 in response to the downward movement of push-button member or slide 11 when stop push-button 5 is actuated.

It will be seen that, when all of the push-buttons 1–5 of the mode selecting device according to this invention are in their elevated or rest positions, micro-switch MSW is open so that no current is drawn from the DC voltage source +V which may be a battery. When one of the operating mode selecting push-buttons 1–4 is actuated or depressed for selecting the respective operating mode of the associated apparatus, the initial downward movement of the selected push-button is effective to cause closing of micro-switch MSW. In response to the closing of micro-switch MSW, a suitable voltage is applied from between the resistors $R_5$ and $R_6$ to the base electrode of switching transistor $Tr_2$ for turning ON the latter. When transistor $Tr_2$ is turned ON, amplifying transistors $Tr_3$ and $Tr_4$ are rendered substantially non-conductive with the result that solenoid 84 remains deenergized. As the selected one of push-buttons 1–4 which is being actuated nears its active position, the respective one of the slide switches $SW_1$–$SW_4$ is closed to complete the circuit for charging capacitor $C_1$. During the charging of capacitor $C_1$, a voltage is applied to the base electrode of switching transistor $Tr_1$ for turning ON the latter. So long as transistor $Tr_1$ is turned ON, substantially the ground potential is applied to the base electrode of transistor $Tr_2$ so that the latter is turned OFF. With transistor $Tr_2$ turned OFF, amplifying transistors $Tr_3$ and $Tr_4$ are effective to cause energizing of solenoid 84. However, when capacitor $C_1$ is fully charged, switching transistor $Tr_1$ is again turned OFF so that transistor $Tr_2$ is restored to its ON condition and the energizing of solenoid 84 is terminated. Accordingly, it will be seen that, upon closing of any one of the slide switches $SW_1$–$SW_4$, solenoid 84 is energized only momentarily, that is, for the period of time required for charging of capacitor $C_1$ even though the micro-switch MSW and the selected one of the slide switches $SW_1$–$SW_4$ remain closed so long as the actuated one of the push-buttons 1–4 is maintained in its active position by the engagement of the locking plate 14 with the projection 13a on the respective bracket 13.

When the stop push-button 5 is actuated to release the locking plate 14 and thereby permit the return of the previously actuated one of the push-buttons 1–4 to its elevated rest position, the respective one of the switches $SW_1$–$SW_4$ is opened to permit the relatively rapid discharge of capacitor $C_1$ through the circular path constituted by the resistor $R_2$ and the diode $D_1$. As the previously actuated one of the push-buttons 1–4 nears its rest position, micro-switch MSW is again opened so as to disconnect the illustrated control circuits from the voltage source.

The operation of the above described mode selecting device according to this invention will now be summarized with particular reference to the selection of the normal forward operating mode of the associated apparatus.

Starting with the control circuits in the condition shown in full lines on FIG. 11 and with all of the push-buttons 1–5 in their elevated or rest positions, the normal forward operating mode is selected by depressing push-button 2 so as to move the respective slide or member 8 downwardly toward its active position indicated in broken lines on FIG. 4. In the course of such downward movement of slide or member 8, switch operating member 41 is pivoted to cause the spring 45 thereon to close micro-switch MSW and the associated coupling 65 is engaged so as to securely connect or couple the respective transmission member 54 with operating member 57. When member or slide 8 nears its fully depressed or active position, that is, after the respective coupling 65 has been engaged, switch $SW_2$ is closed so as to effect the momentary energizing of solenoid 84, as previously described. The energizing of solenoid 84 causes turning of lever 86 to the position shown in broken lines on FIG. 10 with the result that operating member 57 is driven to its operative position by the motive force of solenoid 84. Since the coupling 65 is engaged to connect or couple transmission member 54 with operating member 57, transmission member 54 is moved with operating member 57 to establish the normal forward operating mode of the associated apparatus. Since the other couplings 64, 66 and 67 remain disengaged, transmission members 53, 55 and 56 remain stationary and do not interfere with the movement of transmission member 54 with operating member 57. When operating member 57 is driven to its operative position in response to the momentary energizing of solenoid 84, the nose 100a of latching element 100 engages locking pin 99, as previously described, for locking lever 86 in its position corresponding to the operative position of operating membere 57 even though solenoid 84 is thereafter deenergized. Accordingly, the selected normal forward operating mode of the apparatus is maintained without requiring the continuous energizing of solenoid 84 and the consequent drain of energy from the DC voltage source. So long as the apparatus remains in its normal forward operating mode, the respective push-button 2 is retained in its depressed or active position by the engagement of locking plate 14 with the locking projection 13a on its respective bracket 13. When transmission member 54 is moved with operating member 57 to the operative position of the latter for establishing the normal forward operating mode of the associated apparatus, the associated coupling 65 moves with transmission member 54, for example, to the position indicated in broken lines on FIG. 5 and in full lines on FIG. 9, so that the respective link 69 is inclined with movement of the pin 71 along slot 70 and stretching or tensioning of the spring 73. Accordingly, it will be seen that the spring 73, when stretched or tensioned, tends to return the respective link 69 to its normal vertical position with pin 71 engaging against the lower end of the slot 70.

When it is desired to terminate the normal forward operating mode of the associated apparatus, stop push-button 5 is depressed or actuated. The actuation of push-button 5 causes the energizing of solenoid 95, as previously described, for releasing the locking assembly and thereby permitting spring 92 acting on lever 86 to effect the return movement of operating member 57 to its inoperative position. During such return movement of operating member 57 to its inoperative position, the lug 57b''' at an end of lower plate 57b of the operating member can act against the adjacent end of transmission member 54 for moving the latter with the operating member 57 back to the inoperative position of the latter. The movement of transmission member 54 back to its inoperative position is further induced by the force of the respective spring 73 urging the link 69 back to its normal vertical position.

The actuation of stop push-button 5 to its active position further releases locking plate 14 from the locking projection 13a on bracket 13 secured to slide or member 8 with the result that the respective spring 12 can return member 8 upwardly to its rest position. During such return of member 8 to its elevated rest position, switches $SW_2$ and MSW are successively opened so as to return the control circuits of FIG. 11 to their starting or original condition. Finally, upon the release of stop push-button 5 the spring 12 associated with the respective slide or member 11 returns the latter upwardly to its rest position so that solenoid 95 is deenergized for returning locking lever 96 to the position shown in full lines on FIG. 10.

Although the operation of the mode selecting device according to this invention has been specifically described above in connection with the selection of the normal forward operating mode of the associated apparatus, it will be apparent that any other of the mentioned operating modes of such apparatus may be similarly selected and established by actuation of the respective push-buttons 1, 3, and 4.

It will be noted that, with the mode selecting apparatus according to this invention, only a relatively light force has to be manually applied to any one of the push-buttons 1–4 for selecting the respective operating mode, as the motive force for establishing the selected operating mode is provided by the energized solenoid 84. Further, since the solenoid 84 is only momentarily energized for driving operating member 57 to its operative position and thereby moving one of the transmission members 53–56 corresponding to the selected operating mode, the mode selecting device consumes a minimum amount of electrical power, and thus is ideally suited for use in connection with a battery powered apparatus. Further, by reason of the arrangement of switches MSW and $SW_1$–$SW_4$, solenoid 84 is energized only following the secure engagement of a selected one of the couplings 64–67 for ensuring that the movement of operating member 57 to its operative position will be accompanied by the corresponding movement of one of the transmission members 53–56 for establishing the selected operating mode. Finally, it will be seen that, in the mode selecting device according to this invention, the superposed arrangement of the transmission members 53–56 between the upper and lower plates 57a and 57b of operating members 57 and the described arrangement of the couplings 64–67 for selectively coupling the transmission members 53–56 with operating member 57 provides a compact assembly so that the mode selecting device according to this invention is particularly suited for use with a portable tape recording and/or reproducing apparatus.

Although an illustrative embodiment of the invention has been described in detail herein with reference to the accompanying drawings, it is to be understood that the invention is not limited to that precise embodiment, and that various changes and modifications can be effected therein by one skilled in the art without departing from the scope and spirit of the invention as defined in the appended claims.

What is claimed is:

1. A mode selecting device for a tape recording and/or reproducing apparatus: comprising a plurality of operating mode selecting push-button members which are selectively actuable from rest positions to active positions for selecting corresponding operating modes of the apparatus; a stop push-button member actuable from a rest position to an active position for halting any previously selected operating mode of the apparatus; an electrically energizable driving means; circuit means for momentarily energizing said driving means in response to the actuation of any one of said operating mode selecting push-button members to the active position of the latter; an operating member connected with said driving means and being movable from an inoperative position to an operative position in response to the momentary energizing of said driving means and being urged to return to said inoperative position upon deenergizing of said driving means; locking means having a normal locking condition for locking said operating member in said operative position and a released condition for freeing said operating member to return to said inoperative position; lock releasing means for establishing said released condition of said locking means in response to the actuation of said stop push-button member to said active position thereof; and a plurality of transmission members respectively corresponding to said operating mode selecting push-button members and each being coupled with said operating member in response to actuation of the corresponding push-button member for establishing the corresponding operating mode of the apparatus by the movement of said operating member to said operative position of the latter.

2. A mode selecting device according to claim 1; in which said transmission members are mounted for independent movement parallel to the movement of said operating member between said inoperative and operative positions of the latter; and further comprising a plurality of coupling means respectively corresponding to said operating mode selecting push-button members and each being displaceably from a disengaged condition, in which said operating member is movable independently of the respective transmission member, to an engaged condition in which said coupling means couples the respective transmission member to said operating member for movement with the latter; and means connecting each of said coupling means with the corresponding operating mode selecting push button member for displacement of said coupling means from said disengaged condition to said engaged condition in the course of said actuation of said corresponding push-button member from said rest position to said active position thereof.

3. A mode selecting device according to claim 2; in which said circuit means includes normally open switch means which is closed to commence the momentary energizing of said driving means only when a selected one of said operating mode selecting push-button members is actuated to attain said active position thereof, whereby said momentary energizing of the driving means commences only after one of said coupling means has been displaced to said engaged condition for coupling the respective transmission member to said operating member.

4. A mode selecting device according to claim 1; in which said lock releasing means is electrically energizable to establish said released condition of the locking means; and further comprising circuit means for energizing said lock releasing means in response to said actuation of the stop push-button member.

5. A mode selecting device according to claim 1; in which said operating member includes a pair of elongated plates which are joined in parallel, spaced relation and longitudinally movable between said inoperative and operative positions, and said transmission members are also elongated and mounted parallel to each other between said plates for longitudinal movement independently of each other parallel to the longitudinal movement of said plates; and further comprising a plurality of coupling means respectively corresponding to said operating mode selecting push-button members and each being displaceable from a disengaged condition, in which said operating member is movable independently of the respective transmission member, to an engaged condition in which said coupling means couples the respective transmission member with said operating member for movement with the latter; and means connecting each of said coupling means with the corresponding operating mode selecting push-button member for displacement of said coupling means from said disengaged condition to said engaged condition in the course of said actuation of said corresponding push-button member from said rest position to said active position thereof.

6. A mode selecting device according to claim 5; in which said transmission members have longitudinal slots therein, and at least one of said plates of the operating member has a plurality of apertures respectively corresponding to said operating mode selecting push-button members and being spaced apart along said one plate; and in which each of said coupling means includes a coupling sleeve secured to the corresponding transmission member and being slidable along said slots of the other transmission members, and a coupling pin which, in said engaged condition, extends through the respective aperture of said one plate and axially in said sleeve of the respective transmission member and, in said disengaged condition, is axially withdrawn from said sleeve.

7. A mode selecting device according to claim 6; in which said coupling pin of each coupling means has a head and a reduced diameter stem extending from said head to fit in said sleeve of the respective transmission member in said engaged condition, and each of said apertures of said one plate receives said head of the respective coupling pin, in said engaged condition, and has an extension of reduced width opening from the aperture in the longitudinal direction and along which said stem is relatively slidable in said disengaged condition.

8. A mode selecting device according to claim 7; in which the other of said plates of the operating member has a plurality of apertures aligned with said apertures in said one plate, and each adapted to receive said coupling pin stem of the respective coupling means in said engaged condition of the latter.

9. A mode selecting device for a tape recording and-/or reproducing apparatus; comprising a plurality of push-button members which are selectively actuable from rest positions to active positions for selecting corresponding operating modes of the apparatus; an electrically energizable driving means which is energized in response to the actuation of a selected one of said push-button members to said active position thereof; an operating member connected with said driving means and being movable from an inoperative position to an operative position in response to the energizing of said driving means; a plurality of transmission members respectively corresponding to said push-button members and being mounted in superposed relation to each other for independent movement parallel to the movement of said operating member between said inoperative and operative positions of the latter; a plurality of coupling means respectively corresponding to said push-button members and each being displaceable from a disengaged condition, in which said operating member is movable independently of the respective transmission member, to an engaged condition in which said coupling means couples the respective transmission member to said operating member for movement with the latter to establish the corresponding operating mode of the apparatus by the movement of said operating member to said operative position of the latter; and means connecting each of said coupling means with the respective push-button member for displacement of said coupling means from said disengaged condition to said engaged condition in the course of said actuation of said respective push-button member from said rest position to said active position.

10. A mode selecting device according to claim 9; in which said operating member includes a pair of elongated plates which are joined in parallel, spaced relation and longitudinally movable between said inoperative and operative positions, and said transmission members are also elongated and mounted parallel to each other between said plates of the operating member.

11. A mode selecting device according to claim 10; in which said transmission members have longitudinal slots therein, and at least one of said plates of the operating member has a plurality of apertures respectively corresponding to said operating mode selecting push-button members and being spaced apart along said one plate; and in which each of said coupling means includes a coupling sleeve secured to the corresponding transmission member and being slidable along said slots of the other transmission members, and a coupling pin which, in said engaged condition, extends through the respective aperture of said one plate and axially in said sleeve of the respective transmission member and, in said disengaged condition, is axially withdrawn from said sleeve.

12. A mode selecting device according to claim 11; in which said coupling pin of each coupling means has a head and a reduced diameter stem extending from said head to fit in said sleeve of the respective transmission member in said engaged condition, and each of said apertures of said one plate receives said head of the respective coupling pin, in said engaged condition, and has an extension of reduced width opening from the aperture in the longitudinal direction and along which said stem is relatively slidable in said disengaged condition.

13. A mode selecting device according to claim 12; in which the other of said plates of the operating member has a plurality of apertures aligned with said apertures in said one plate, and each adapted to receive said coupling pin stem of the respective coupling means in said engaged condition of the latter.

14. A mode selecting device according to claim 9; in which said push-button members are arranged in a row and movable parallel to each other between said rest and active positions; and further comprising first and second slides extending across said row and being each movable between centered and laterally displaced positions, each of said slides having cutouts respectively corresponding to said push-button members, projections on said push-button members each entering the respective cutouts of said slides in said centered positions of the latter upon movement of the respective push-button member to its active position for displacing one of said slides from its centered position and thereby blocking the movement of the other push-button members from their rest positions, and spring means for yieldably urging said slides to said centered positions.

15. A mode selecting device according to claim 14; in which said first slide has L-shaped openings in its opposite end portions, said second slide has inverted L-shaped openings in its opposite end portions, and said spring means includes a pair of leaf-spring members each having upper and lower spring strips, one of said leaf-spring members having said upper and lower spring strips thereof extending through said openings at one end of said first and second slides, and the other of said leaf-spring members having said upper and lower spring strips thereof extending through said openings at the other end of said first and second slides.

* * * * *